United States Patent [19]

Sommer

[11] Patent Number: 5,538,292
[45] Date of Patent: Jul. 23, 1996

[54] ROTARY UNION

[75] Inventor: Gordon M. Sommer, Grosse Pointe Farms, Mich.

[73] Assignee: Midwest Brake Bond Company, Warren, Mich.

[21] Appl. No.: 373,047

[22] Filed: Jan. 17, 1995

[51] Int. Cl.$^6$ .............. F16L 27/00; F16L 17/00
[52] U.S. Cl. .............. 285/13; 285/98; 285/276; 137/580
[58] Field of Search .............. 285/13, 48, 101, 285/95, 276, 278, 136, 134; 137/580; 192/18 A

[56] References Cited

U.S. PATENT DOCUMENTS

| | | |
|---|---|---|
| 3,501,174 | 3/1970 | Walker . |
| 3,586,051 | 6/1971 | Walker . |
| 3,873,061 | 3/1975 | Thylefors .............. 137/580 |
| 3,889,983 | 6/1975 | Freize et al. .............. 285/98 |
| 4,192,559 | 3/1980 | Hewitt . |
| 4,557,506 | 12/1985 | Hanks et al. . |
| 4,561,681 | 12/1985 | Lebsock . |
| 4,632,431 | 12/1986 | McCracken . |
| 4,726,397 | 2/1988 | Stich .............. 137/580 |
| 4,749,335 | 6/1988 | Brandt et al. . |
| 4,781,215 | 11/1988 | Mayhall, Jr. et al. . |
| 4,817,995 | 4/1989 | Deubler et al. . |
| 4,848,400 | 7/1989 | Grant et al. .............. 137/580 |
| 4,858,961 | 8/1989 | Nunogaki . |
| 4,928,997 | 5/1990 | Reisener et al. . |
| 4,976,282 | 12/1990 | Kubala . |
| 5,022,686 | 6/1991 | Heel et al. .............. 285/134 |
| 5,146,786 | 9/1992 | Nachbar . |
| 5,174,614 | 12/1992 | Kaleniecki . |
| 5,282,375 | 2/1994 | Lee, Jr. et al. . |
| 5,285,744 | 2/1994 | Grantham et al. . |
| 5,292,030 | 3/1994 | Kateman et al. . |
| 5,303,959 | 4/1994 | Medsker .............. 285/134 |
| 5,305,713 | 4/1994 | Vadakin . |
| 5,323,797 | 6/1994 | Rankin . |
| 5,439,029 | 8/1995 | Becker .............. 285/101 |

FOREIGN PATENT DOCUMENTS

| | | | |
|---|---|---|---|
| 3810060 | 10/1989 | Germany .............. | 285/98 |
| 5133491 | 5/1993 | Japan .............. | 285/98 |
| 262196 | 11/1956 | United Kingdom .............. | 285/98 |

*Primary Examiner*—Eric K. Nicholson
*Attorney, Agent, or Firm*—Harness, Dickey & Pierce

[57] ABSTRACT

A rotary union includes a housing which encases a rotor having a first sealing surface and a stator having a second sealing surface. The sealing surfaces are biased against each other due to a load exerted by a biasing member. An inlet chamber is in communication with the fluid being transposed by the union and operates to urge the stator against the rotor due to the pressurized fluid in the chamber reacting against the stator. The stator and the housing define a reaction chamber. Pressurized fluid supplied to the reaction chamber operates to urge the stator away from the rotor thus enabling the disengagement of the sealing surfaces.

23 Claims, 5 Drawing Sheets

5,538,292

ROTARY UNION

FIELD OF THE INVENTION

The present invention relates generally to rotary unions. More particularly, the present invention relates to rotary unions which incorporate a retraction port which provides the user with the ability to separate the sealing surfaces of the rotary union, when flow of lubricant is not required.

BACKGROUND OF THE INVENTION

Rotary unions that incorporate a rotating fluid seal between the axial mateable sealing surfaces of a pair of relatively rotatable parts thereof are well known in the art. Typical of these rotary unions is a rotary union of the kind for effecting the transfer of fluid from a stationary fluid source to a fluid conduit in the form of a rotating spindle, shaft, clutch hub or other such device into which fluid is to be fed.

A typical fluid rotary union includes a rotor seal member and a stator seal member which are assembled in co-axial relationship in a common housing for relative rotation and passing fluid. The stator and rotor are axially biased towards one another such that the axial sealing surfaces thereof are in engagement and define a rotating seal interface in the housing that is generally perpendicular to the axis of rotation. The rotor seal member is journalled on a bearing for rotation relative to the housing and normally includes a threaded shaft on the line which extends from the housing to be affixed to the rotating spindle for rotation therewith.

These prior art rotary unions must be capable of containing very high pressures while rotating at very high speeds. This is made possible by an almost perfect mating of the sealing surfaces which are disposed generally perpendicular to the axis of rotation. These micro-lapped sealing surfaces must rotate smoothly and easily with a minimum amount of friction to assure long life and still not leak. In order to maintain the sealing at high pressures, these prior art rotary unions utilize the pressure seal principle. A nominal load is applied to the two sealing surfaces by a biasing spring in order to seal the union during times when the fluid within the coupling is not pressurized. As the pressure of the fluid within the coupling increases, the load between the two sealing surfaces increases due to the fluid pressure acting against either the rotor or the stator to force these two components together. The total amount of pressure acting on the rotating sealing surfaces can be controlled by controlling the surface areas exposed to the fluid pressure. This, in turn, will control the amount of friction between the sealing surfaces, the amount of torque to rotate the coupling and thus the wear of the sealing surfaces. While the total amount of load is controllable, these prior art unions maintain a load between the sealing surfaces when the union is not subjected to fluid pressure. The presence of this load means the friction between the sealing surfaces continues to cause a higher torque to rotate the union and additional wear between the sealing surfaces.

Rotary unions have been designed to control this pressure seal principle by incorporating a balanced sealing pressure on the loaded rotor or stator. The balanced sealing pressure on the rotor or stator means that the sealing load on the sealing surfaces is maintained only by the biasing spring with loading by the pressurized fluid being generally eliminated. While this balanced sealing approach has increased the durability of the rotary union, the sealing of the rotary union is somewhat compromised due to the identical sealing load being applied at both low pressure and high pressure conditions of the rotary union. In addition, when these balanced sealing pressure rotary unions are operated without fluid pressure, the load between the sealing surfaces is still present. The presence of this load means the friction between the sealing surfaces continues to cause a higher torque to rotate the union and additional wear between the sealing surfaces.

Accordingly, what is needed is a rotary union which is capable of providing sufficient sealing loads on the sealing surfaces during periods when the rotary union is subjected to fluid pressures to insure a positive seal between the sealing surfaces and is also capable of eliminating the load between the sealing surfaces during periods when the rotary union is not subjected to fluid pressures.

SUMMARY OF THE INVENTION

The present invention provides the art with a rotary union which conducts pressurized fluid between a stationary and a rotating component. The rotary union incorporates a stationary and a rotating sealing surface which are generally perpendicular to the axis of rotation. A separate fluid port is provided which provides a pressurized fluid to the coupling in order to eliminate the sealing load between the sealing surfaces. The pressurized fluid supplied to the separate fluid port can be the same pressurized fluid being transported by the rotary union or it can be from a separate pressurized fluid source.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DESCRIPTION OF THE PREFERRED EMBODIMENT

Figure 1:
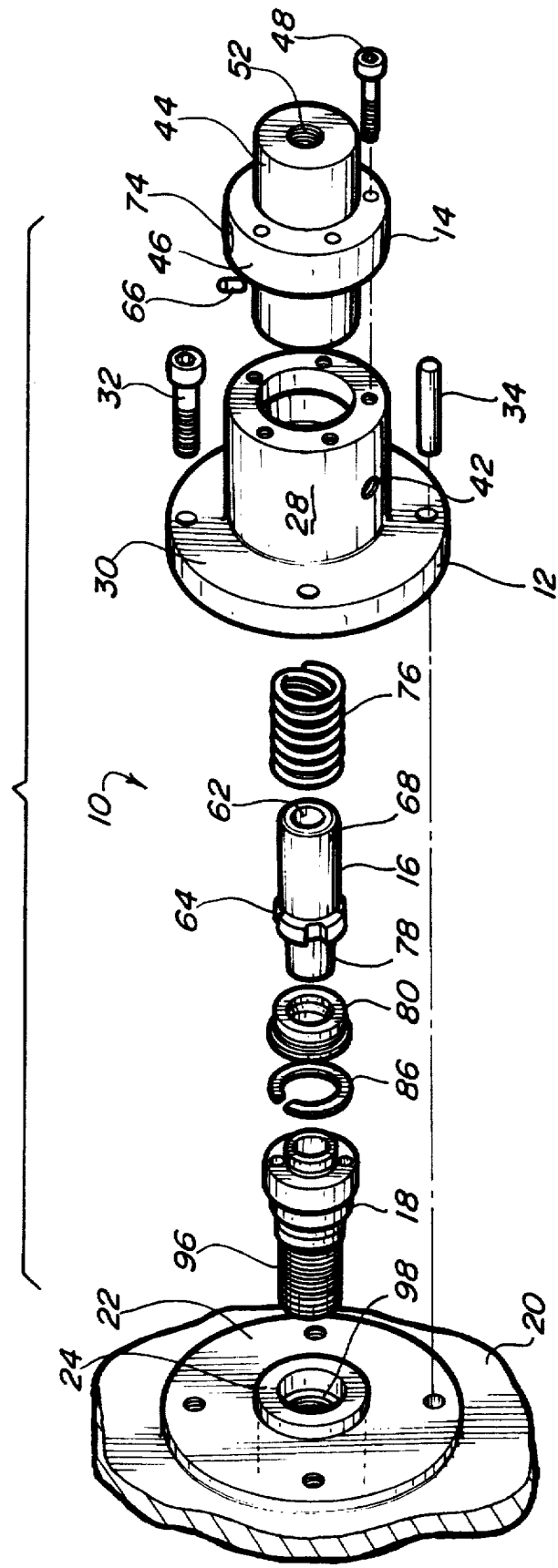
FIG. 1 is an exploded perspective view of the rotary union according to the present invention.

Referring now to the drawings in which like reference numerals designate like or corresponding parts throughout the several views, there is shown in FIGS. 1 through 5, a rotary union for transferring pressurized fluid according to the present invention which is designated generally by the reference numeral 10. Rotary union 10 is comprised of a support housing 12, a stator housing 14, a stator 16 and a rotor 18. Rotary union 10 is shown for exemplary purposes being secured to an apparatus 20. Apparatus 20 includes a stationary member 22 and a rotating shaft 24 having an axis of rotation 26. Rotary union 10 is designed to be an original equipment component which is secured to apparatus 20.

Support housing 12 includes a generally cylindrical body 28 having an annular flange 30 extending radially outward from one end to facilitate the mounting of union 10 to stationary member 22 of apparatus 20. Housing 12 is secured to member 22 using a plurality of bolts 32 and a plurality of dowel pins 34 both of which extends through flange 30 and into member 22. Housing 12 defines an axis 36 which is the functional axis for union 10. Bolts 32 and dowel pins 34 are incorporated into apparatus 20 to mount housing 12 such that axis 36 is aligned with axis 26 of rotating shaft 24. Cylindrical body 28 defines a bore 38 which extends through body 28 to provide a chamber 40 for housing the sealing surfaces of rotary union 10. A drain port 42 extends through cylindrical body 28 into chamber 40 to drain any fluid which may flow between the sealing surfaces of union 10 back to a sump or tank (not shown) which supplies the pump (not shown) for providing pressurized fluid to rotary union 10. A labyrinth 43 insures that the fluid which flows from between the sealing surfaces will be directed towards drain port 42. Cylindrical body 28 is adapted at the end of body 28 opposite to flange 30 for mounting stator housing 14.

Stator housing 14 includes a generally cylindrical body 44 having an annular flange 46 extending radially outward from the exterior surface of body 44 to facilitate the mounting of housing 14 to housing 12. Housing 14 is secured to housing 12 using a plurality of bolts 48 which extend through flange 46 and into housing 12. Cylindrical body 44 defines a bore 50 which extends through housing 14 to provide for the locating of stator 16. The end of housing 14 opposite to support housing 12 defines a threaded bore 52 to which the stationary fluid supply source is attached. Bore 50 of housing 14 includes an inwardly extending annular flange 54 for mounting a seal 56 which seals the interface between housing 14 and stator 16.

Figure 2:
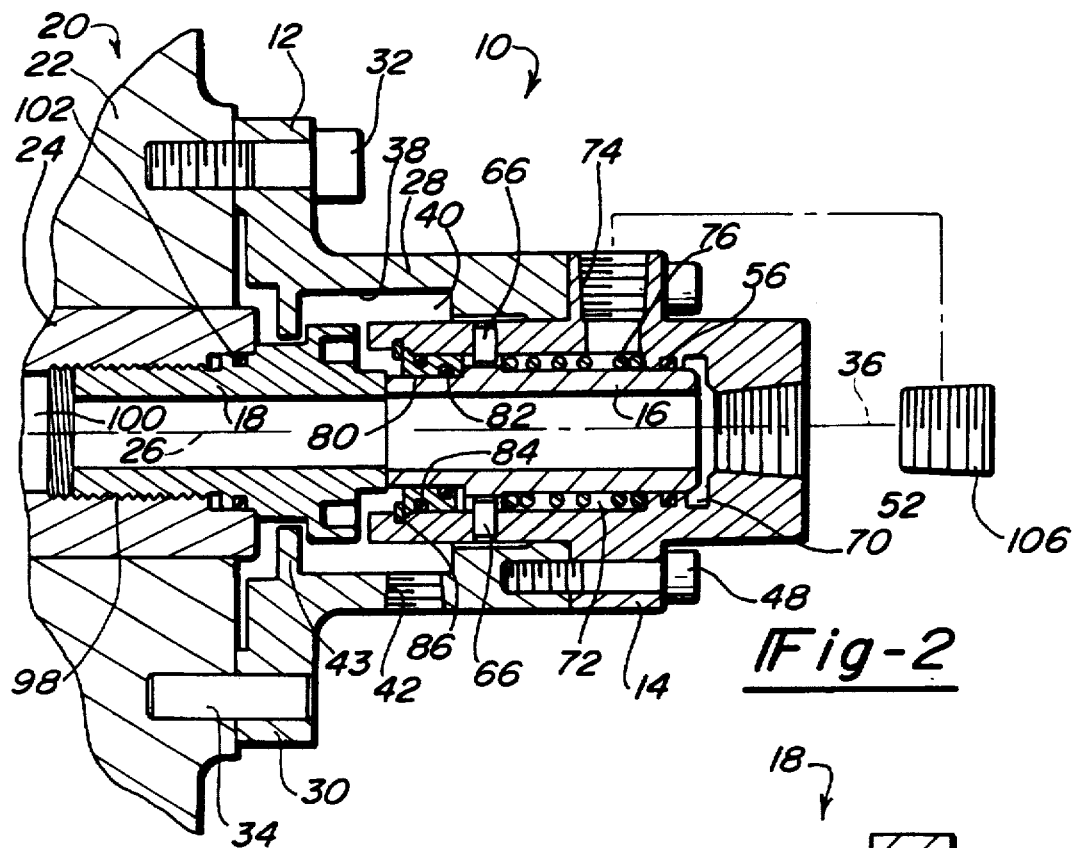
FIG. 2 is a side elevational view, partially in cross section, of the assembled rotary union in accordance with the present invention.

Stator 16 includes a generally cylindrical body 58 having an annular flange 60 extending radially outward from the exterior surface of body 58. Stator 16 includes a through bore 62 for transporting the pressurized fluid through union 10. Stator 16 is disposed within bore 50 of stator housing 14 such that stator 16 is capable of axial movement along axis 36. The outside diameter of flange 60 is designed to be slidingly received within bore 50 and flange 60 defines a plurality of sills 64 which extend through flange 60 for the passing of pressurized fluid. A plurality of dowel pins 66 extend through the wall of body 44 of stator housing 14 and into a respective slot 64 to prohibit the rotation of stator 16 with respect to housing 14 while still allowing the axial movement of stator 16 along axis 36. The end of body 58 extending from flange 60 away from housing 12 defines a first external diameter 68 which mates with annular flange 54 and seal 56 of stator housing 14 to define an inlet pressure chamber 70 and a retraction pressure chamber 72. A retraction port 74 extends through flange 46 of stator housing 14 into chamber 72 to provide access to chamber 72 by an external source of pressurized fluid (not shown). A coil spring 76 is disposed within chamber 72 between flanges 54 and 60 in order to urge stator 16 to the left as shown in FIG. 2 or into sealing engagement with rotor 18. The end of body 58 extending from flange 60 towards housing 12 defines a second external diameter 78 which is smaller than diameter 68 to provide for the selective pressurized unloading or retraction of the sealing faces as will be discussed later herein. Annular ring 80 extends between external diameter 78 and bore 50. Annular ring 80 is provided with an internal seal 82 which seals between ring 80 and stator 16 and an external seal 84 which seals between ring 80 and stator housing 14. Retraction chamber 72 is thus isolated from bore 62, inlet pressure chamber 70 and the external environment by seals 56, 82 and 84. Annular ring 80 is retained within bore 50 by a snap ring 86 which extends into cylindrical body 44. Stator 16 defines a sealing surface 88 which mates with a sealing surface 90 located on rotor 18.

Figure 3:
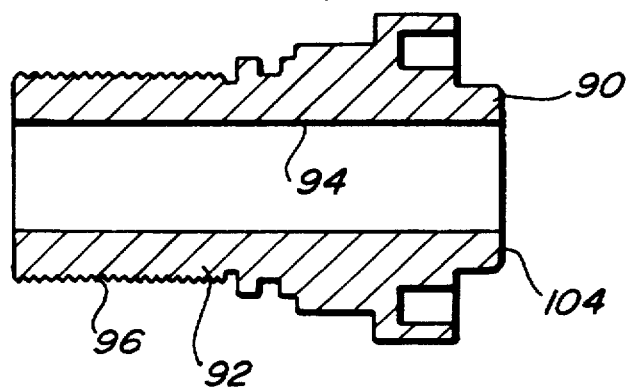
FIG. 3 is a side elevational view, in cross section, of the rotor shown in FIGS. 1 and 2.

Rotor 18 includes a generally cylindrical body 92 defining a through bore 94 for transporting the pressurized fluid through union 10. Rotor 18 is adapted at one end to rotatably engage shaft 24. As illustrated in FIG. 3, rotor 18 includes an external thread 96 which threadingly engages an internal thread 98 disposed within a fluid passage 100 of shaft 24. A seal 102 disposed between rotor 18 and shaft 24 maintains a fluid seal for bore 94 and passage 100. The end of rotor 18 opposite to splines 96 defines sealing surface 90 which sealingly mates with sealing surface 88 on stator 16 to complete the route for pressurized fluid to flow through union 10.

Sealing surfaces 88 and 90 are normally micro-lapped such that rotor 18 rotates smoothly and easily with respect to stator 16 while insuring a sealing interface between stator 16 and rotor 18. With the incorporation of labyrinth 43 and drain port 42 which transport any fluid passing between sealing surfaces 88 and 90 back to the tank or sump, sealing surfaces 88 and 90 can be supplied with micro-lapped grooves 104 which transport a minute portion of the pressurized fluid moving through union 10 to the interface between sealing surfaces 88 and 90. The fluid which is transported between sealing surfaces 88 and 90 by micro-lapped grooves 104 will lubricate the interface between sealing surfaces 88 and 90 thus reducing friction and wear between the sealimg surfaces as well as reducing the torque required to rotate union 10. The fluid which is transported by micro-lapped grooves 104 will eventually leak from between sealing surfaces 88 and 90 and be returned to the tank or sump by labyrinth 43 and drain port 42.

Figure 4:
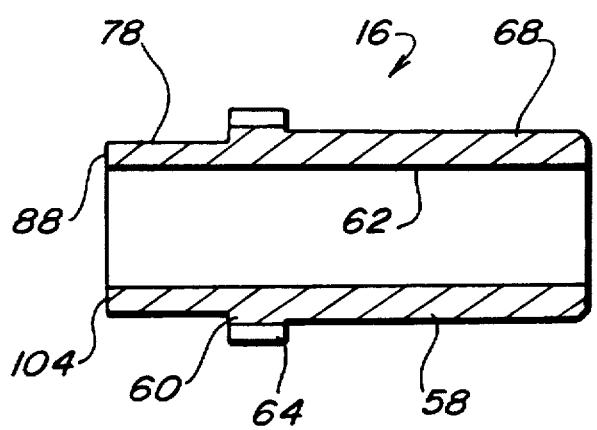
FIG. 4 is a side elevational view, in cross section, of the stator shown in FIGS. 1 and 2.
Figure 5:
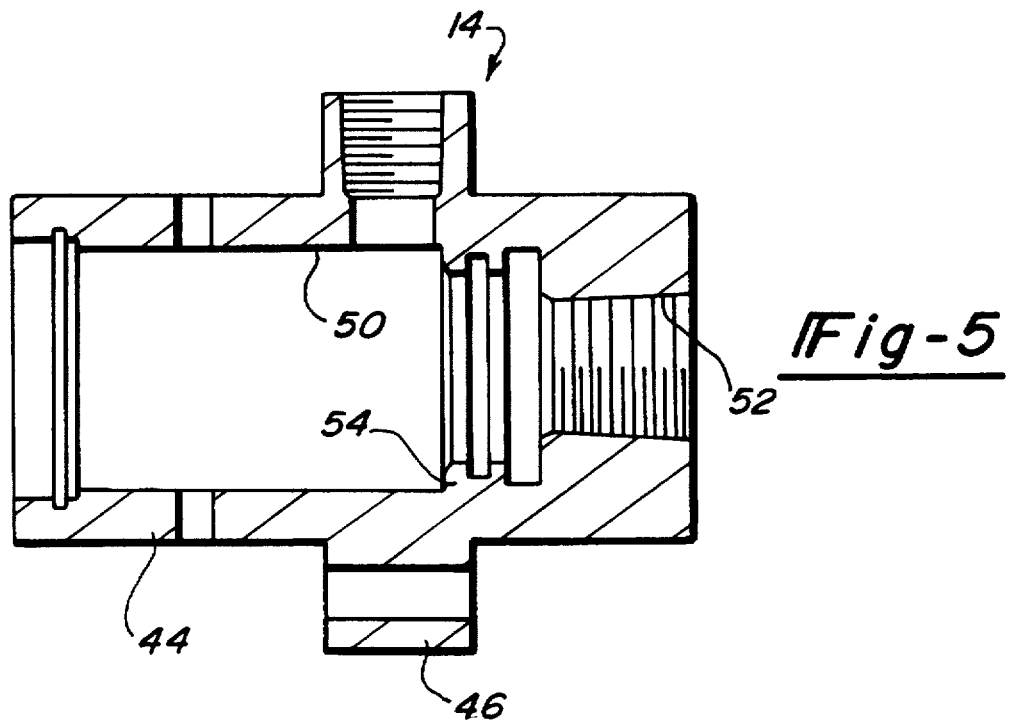
FIG. 5 is a side elevational view, in cross section, of the stator housing shown in FIGS. 1 and 2.

The operation of rotary union 10 begins with union 10 being mounted to apparatus 20 as shown in FIG. 2. A source of fluid (not shown) is provided to threaded bore 52 of stator housing 14. When the fluid being supplied to bore 52 is not under pressure, coil spring 76 urges stator 16 against rotor 18 thus engaging sealing surfaces 88 and 90. The load applied between sealing surfaces 88 and 90 will only be dependant upon the design of coil spring 76. Retraction port 74 is provided in order to allow pressurized fluid to be supplied to reaction pressure chamber 72 totally independant of inlet pressure chamber 70. Pressurized fluid supplied to chamber 72 reacts against both surfaces of flange 60 due to the plurality of slots 64 extending through flange 60. The pressurized fluid within chamber 72 will act against stator 16 and urge stator 16 to the right as shown in FIG. 2 against the load of coil spring 76 thus eliminating the load applied between sealing surfaces 88 and 90 by separating sealing surfaces 88 and 90. This urging of stator 16 to the right is due to the fact that diameter 78 of stator 16 is smaller than diameter 68 of stator 16 thus providing a larger surface area on the left side of flange 60 than on the right side of flange 60 as shown in FIG. 4. The load applied between sealing surfaces 88 and 90 can be totally eliminated by knowing the strength of coil spring 76, the difference in areas between the sides of flange 60 and then applying a specified pressure to retraction port 74.

When the fluid being supplied to threaded bore 52 is under pressure, coil spring 76 urges stator 16 against rotor 18 and the pressurized fluid within inlet pressure chamber 70 reacts against the end of stator 16 to increase the load by which stator 16 is urged against rotor 18 engaging sealing surfaces 88 and 90. The load applied between sealing surfaces 88 and 90 can be controlled by knowing the strength of coil spring 76, the pressure of the fluid within inlet pressure chamber 70 and the surface area exposed to inlet pressure chamber 70. When pressurized fluid is being supplied to bore 52, pressurized fluid is not being supplied to port 74.

Retraction port 74 is totally independant from threaded bore 52. When connecting the pressurized fluid to threaded bore 52, a valve 106 can be included which selectively supplies the pressurized fluid to either threaded bore 52 or retraction port 74. This allows an operator to switch valve 106 such that pressurized fluid is being supplied to threaded bore 52 when apparatus 20 requires the flow of pressurized fluid. Sealing surfaces 88 and 90 are urged together due to the load exerted by coil spring 76 and the load exerted by the fluid pressure acting on the area of stator 16 exposed to the fluid pressure. When apparatus 20 does not require the flow of pressurized fluid, valve 106 can be switched to supply pressurized fluid to retraction port 74, thus separating sealing surfaces 88 and 90 in order to eliminate any wear or friction between surfaces 88 and 90.

Figure 6:
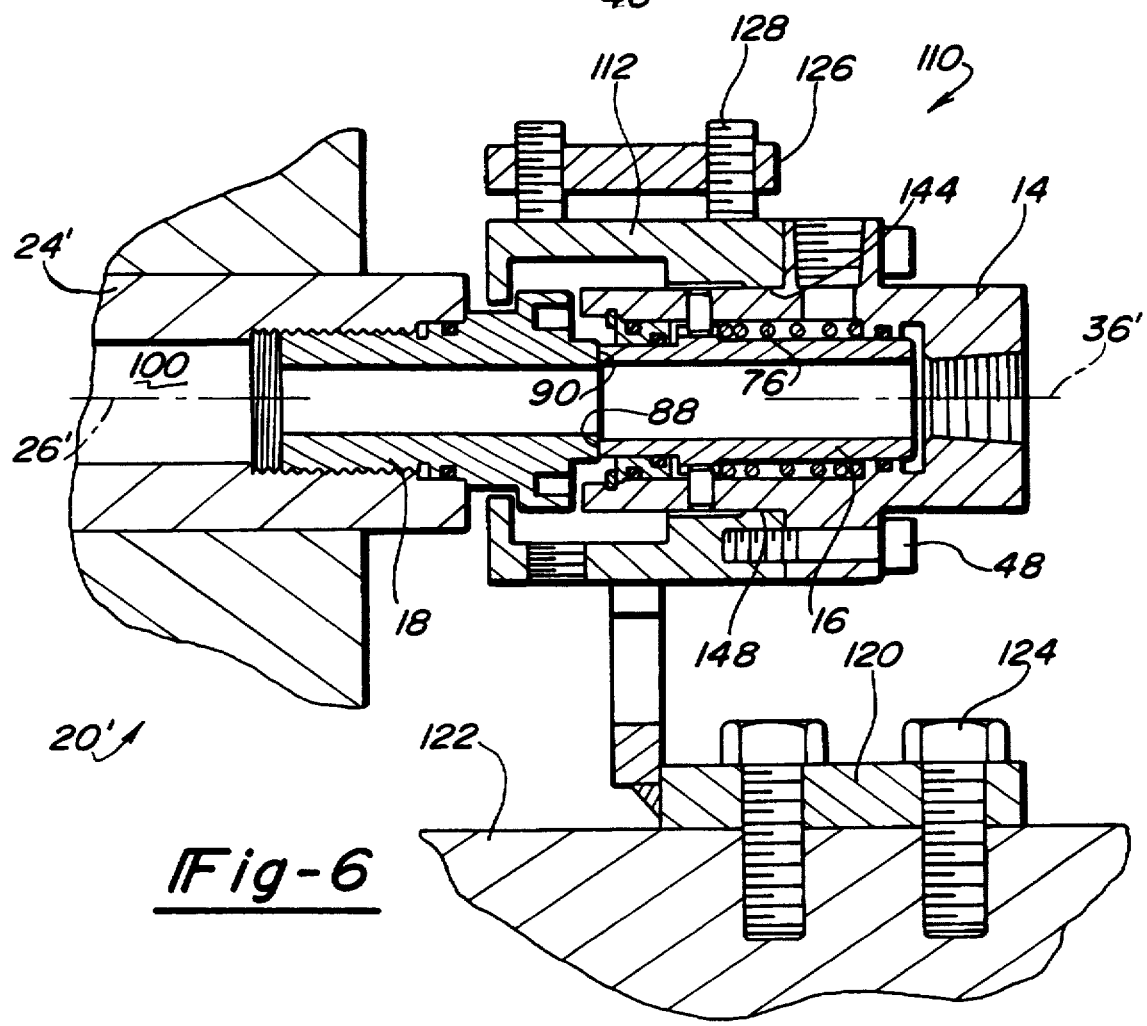
FIG. 6 is a side elevational view, partially in cross section, of an assembled rotary union in accordance with another embodiment of the present invention.
Figure 7:
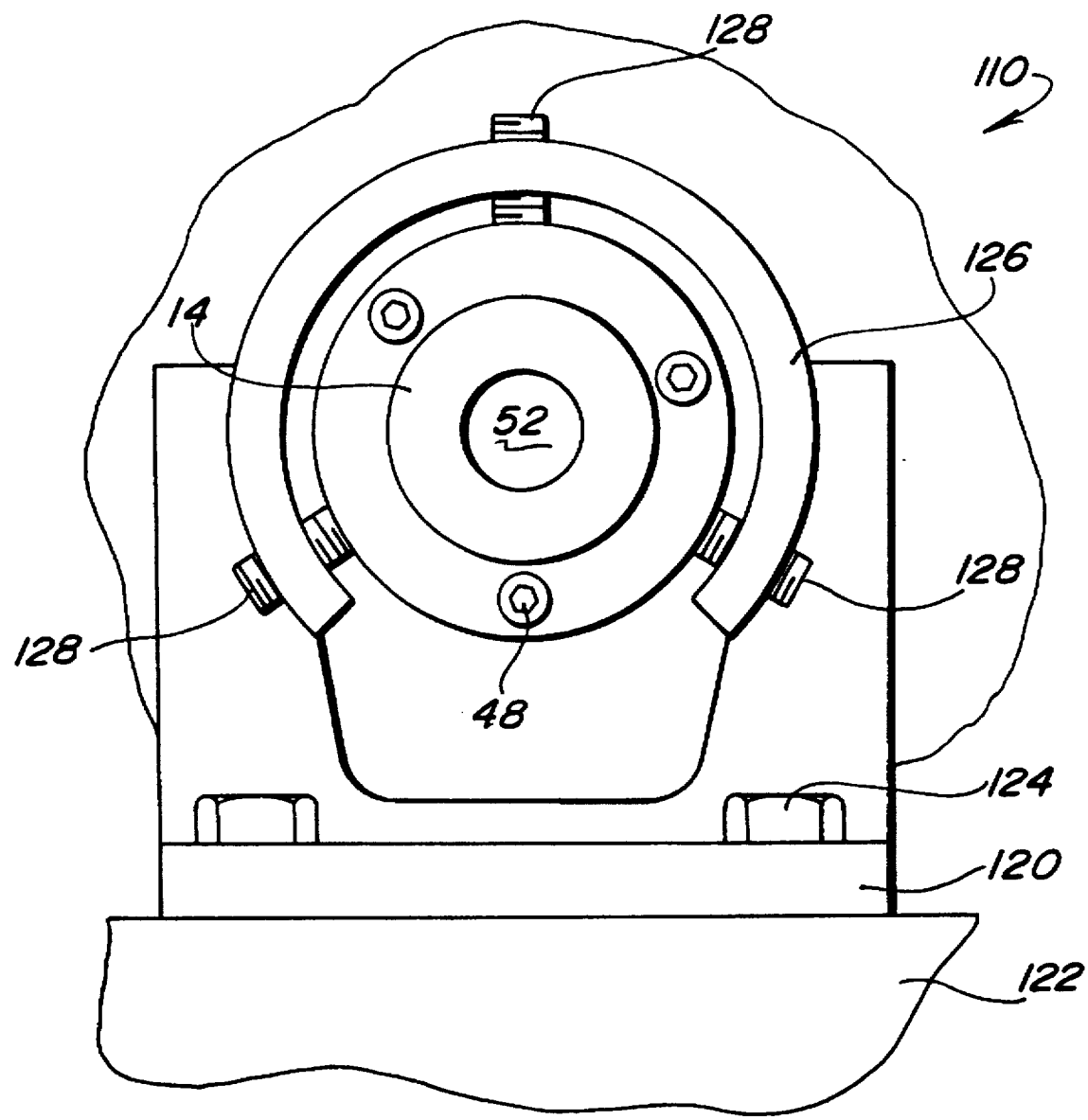
FIG. 7 is an end view of the rotary union shown in FIG. 6.
Figure 8:
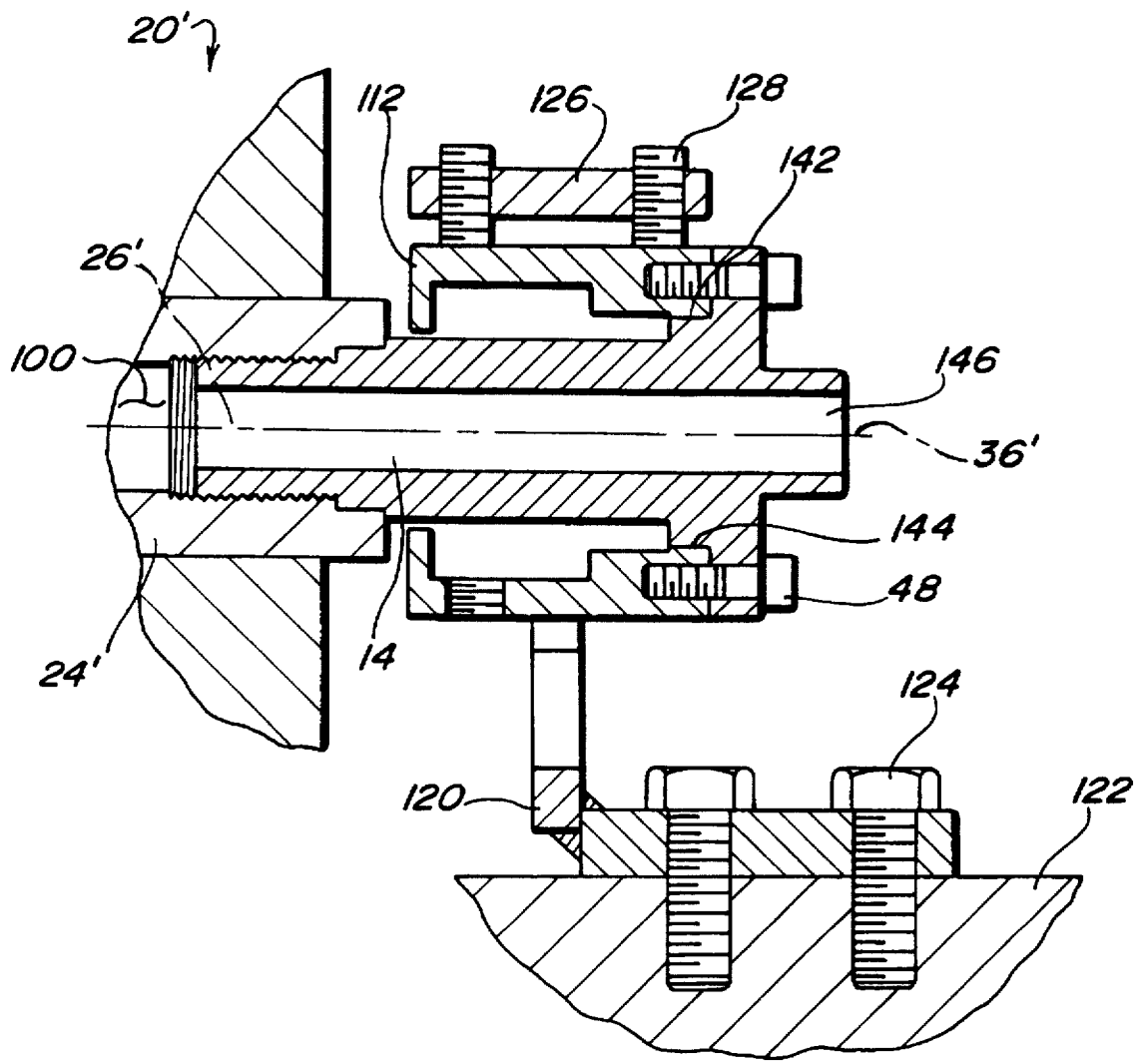
FIG. 8 is a side elevational view, partially in cross section, of an adjustment plug being utilized to align the axes of the rotary union shown in FIGS. 6 and 7.

FIGS. 6 through 8 show a rotary union 110 according to another embodiment of the present invention. Rotary union 110 is similar to rotary union 10 with the exception that support housing 12 of union 10 has been replaced by support housing 112 in union 110. Support housing 112 is similar to support housing 12 except for the elimination of flange 30. Support housing 112 is secured in an axially aligned position with shaft 24' by an L-shaped bracket 120 rather than by flange 30. Rotary union 110 is designed to be incorporated into an apparatus 20' as an after market retro-fit instead of the original equipment manufacture design of rotary union 10.

L-shaped bracket 120 provides of the adjustment of axis 36' of housing 112, in relationship to axis 26' of shaft 24'. Axis 36' is the functional axis for union 110 while axis 26' is the axis of rotation for shaft 24'. Support housing 112 is mounted to a stationary member 122 by utilization of L-shaped bracket 120 and a plurality of bolts 124. Stationary member 122 can be a portion of apparatus 20 or member 122 can be a separate component. A partially tubular support frame 126 is fixedly secured to bracket 120 and bracket 120 is positioned to locate frame 126 generally coaxial with shaft 24 of apparatus 20. A plurality of threaded adjustment screws 128 extend through frame 126 and support housing 112 within frame 126. Thus, by adjusting the individual screws 128, axis 36' of housing 112 can be perfectly aligned with axis 26' of shaft 24' in order to insure the proper interfacing of sealing faces 88 and 90. The remainder on union 110 including the function and operation are identical to those shown and described for rotary union 10.

FIG. 8 illustrates the adjustment procedures of adjusting screws 128 in order to align axis 36' of housing 112 with axis 26' of shaft 24'. L-shaped bracket 120 is first fixedly secured to member 122 using the plurality of bolts 124 with frame 126 generally co-axial with axis 26'. An installation plug 140 is fixedly secured to housing 112 by the plurality of bolts 48. Adjusting plug 140 has an exterior surface 142 which mates with an internal surface 144 on housing 112 to co-axially locate housing 112 relative to plug 140. With adjusting screws 128 being loosened or removed, the assembly of installation plug 140 and housing 112 is threaded into shaft 24' and tightened using an integral hex drive 146. Adjusting screws 128 are then tightened against housing 112 to positively secure housing 112 to frame 126 of bracket 120. Once adjusting screws 128 are tightened, axis 36' which is defined by housing 112, is aligned with axil 26' of shaft 24' due to plug 140 being threadingly received within shaft 24' and the mating of surfaces 142 and 144. Once housing 112 has been secured by screws 128, bolts 48 and plug 140 are removed and the remainder of the internal components of rotary union 110 are assembled into housing 112. Stator housing 14 includes an external surface 148 which is also designed to mate with surface 144 to insure that stator housing 14 will be located coaxial with axis 36'.

While the above detailed description describes the preferred embodiment of the present invention, it should be understood that the present invention is susceptible to modification, variation and alteration without deviating from the scope and fair meaning of the subjoined claims.

What is claimed is:

1. A rotary union comprising:

a housing defining an inlet chamber and a retraction chamber;

a rotor rotatably supported with respect to said housing, said rotor defining a first sealing surface;

a stator mounted for longitudinal movement within said housing and defining a second sealing surface, said stator being movable in a first direction such that said second sealing surface engages said first sealing surface and an opposite direction such that said second sealing surface disengages said first sealing surface, said stator being urged in said first direction by pressurized fluid being supplied to said inlet chamber; and fluid actuated means disposed within said retraction chamber for urging said stator in said opposite direction when pressurized fluid is supplied to said retraction chamber.

2. The rotary union according to claim 1 further comprising a biasing member for biasing said stator in said first direction.

3. The rotary union according to claim 1 wherein said fluid actuated means includes a flange extending radially from said stator.

4. The rotary union according to claim 1 wherein said housing defines an axis and said rotary union further comprises a bracket, said bracket mounting said housing such that the position of said axis is adjustable.

5. The rotary union according to claim 1 wherein said housing defines a first port for providing access to said retraction chamber.

6. The rotary union according to claim 5 wherein said housing defines a second port for providing access to said inlet chamber.

7. The rotary union according to claim 1 wherein one of said first and second sealing surfaces define grooves for directing a portion of said pressurized fluid being supplied to said inlet chamber between said first and second sealing surfaces.

8. A rotary union comprising:

a housing defining a retraction chamber;

a rotor rotatably supported with respect to said housing, said rotor defining a first sealing surface;

a stator mounted for longitudinal movement within said housing and defining a second sealing surface, said stator being movable in a first direction such that said second sealing surface engages said first sealing surface and an opposite direction such that said second sealing surface disengages said first sealing surface;

a biasing member for urging said stator in said first direction; and fluid actuated means disposed within said retraction chamber for urging said stator is said opposite direction when pressurized fluid is supplied to said retraction chamber.

9. The rotary union according to claim 8 wherein said housing further defines an inlet chamber, said stator being urged in said first direction when pressurized fluid is supplied to said inlet chamber.

10. The rotary union according to claim 9 wherein one of said first and second sealing surfaces define grooves for directing a portion of said pressurized fluid being supplied to said inlet chamber between said first and second sealing surfaces.

11. The rotary union according to claim 8 wherein said fluid actuated means includes a flange extending radially from said stator.

12. The rotary union according to claim 8 wherein said housing defines an axis and said rotary union further comprises a bracket, said bracket mounting said housing such that the position of said axis is adjustable.

13. The rotary union according to claim 8 wherein said housing defines a first port for providing access to said retraction chamber.

14. The rotary union according to claim 13 wherein said housing defines a second port for providing access to said inlet chamber.

15. A rotary union comprising:

a housing;

a rotor rotatably supported with respect to said housing, said rotor defining a first sealing surface;

a stator mounted for longitudinal movement within said housing and defining a second sealing surface, said stator being movable in a first direction such that said second sealing surface engages said first sealing surface and an opposite direction such that said second sealing surface disengages said first sealing surface, said stator and said housing defining a retraction chamber; and fluid actuated means disposed within said retraction chamber for urging said stator in said opposite direction when pressurized fluid is supplied to said retraction chamber.

16. The rotary union according to claim 15 further comprising a biasing member for urging said stator in said first direction.

17. The rotary union according to claim 16 wherein said housing defines an inlet chamber, said stator being urged in said first direction when pressurized fluid is supplied to said inlet chamber.

18. The rotary union according to claim 15 wherein said housing includes a stator housing fixedly secured to a support housing, said retraction chamber being defined by said stator and said stator housing.

19. The rotary union according to claim 18 further comprising a biasing member disposed within said retraction chamber for urging said stator in said first direction.

20. The rotary union according to claim 18 wherein said stator housing defines an inlet chamber, said stator being urged in said first direction when pressurized fluid is supplied to said inlet chamber.

21. The rotary union according to claim 20 wherein one of said first and second sealing surfaces define grooves for directing a portion of said pressurized fluid being supplied to said inlet chamber between said first and second sealing surfaces.

22. The rotary union according to claim 15 wherein said fluid actuated means includes a flange extending radially from said stator.

23. The rotary union according to claim 15 wherein said housing defines an axis and said rotary union further comprises a bracket, said bracket mounting said housing such that the position of said axis is adjustable.

\* \* \* \* \*